Oct. 13, 1931.                A. D. PATCHEN                1,827,606
               PRONGED PLATE DEVICE FOR ATTACHING SEAT COVERS
                            Filed Aug. 10, 1928
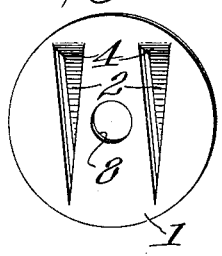
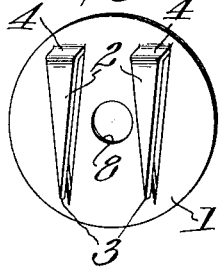
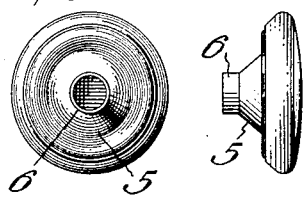
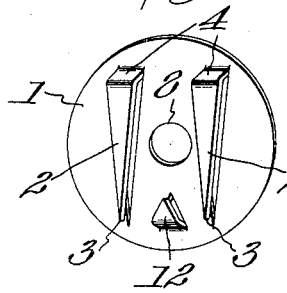
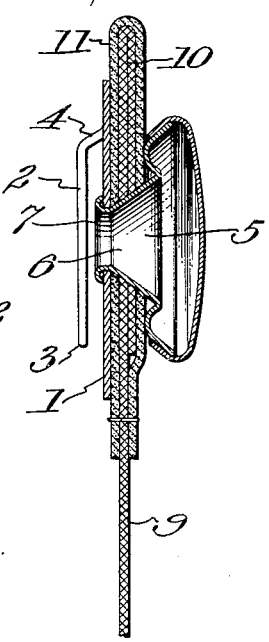
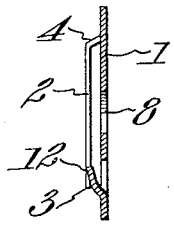
Inventor:
Arthur Dyckman Patchen
by
Wm. N. Finckel
Attorney.

Patented Oct. 13, 1931

1,827,606

UNITED STATES PATENT OFFICE

ARTHUR DYCKMAN PATCHEN, OF BLOOMFIELD, NEW JERSEY, ASSIGNOR TO SCOVILL MANUFACTURING COMPANY, OF WATERBURY, CONNECTICUT, A CORPORATION OF CONNECTICUT

PRONGED PLATE DEVICE FOR ATTACHING SEAT COVERS

Application filed August 10, 1928. Serial No. 298,841.

The object of this invention is to provide a device for attaching loose articles to fixed objects, as, for example, attaching seat covers to the upholstered parts of automobiles.

The invention consists of a plate having integral prongs, arranged within its periphery, and the plate being provided with a hole which is adapted to receive and be engaged by a fastening medium to attach the plate to the movable article, ready for use in connection with the fixed object, as I will proceed now to explain and finally claim.

In the accompanying drawings illustrating the invention, in the several figures of which like parts are similarly designated, Figure 1 is a front perspective view of the plate. Fig. 2 is a rear perspective view of the plate. Fig. 3 is a rear elevation, and Fig. 4 is a side view of one form of means for attaching the plate to an article. Fig. 5 is a longitudinal section, on a larger scale, illustrating the application of the pronged plate to a movable article, such as a cover for a seat or other upholstered part of an automobile. Fig. 6 is a rear perspective view illustrating a modification containing a locking prong, and Fig. 7 is a vertical cross section thereof.

Without thereby limiting the invention to mere shape, 1 represents a circular flat plate, having a pair of prongs 2 cut, that is to say, incised, in its substance so as to free their sides and pointed ends and projecting outwardly and downwardly from the upper portion of the plate and wholly within the circumferential limits of the plate, so as to leave no unsightly projections beyond such limits. These prongs are shown as of V shape, and they are arranged side-by-side and parallel with the back of the plate and spaced apart from one another and their ends 3 are sufficiently sharp to readily enter upholstery or other material, and they stand off from the back of the plate, as at 4, a sufficient distance to permit the extension of the upholstery or other goods between the body of the plate and the prongs when the mounted device is applied to such upholstery or other goods.

The plate thus constructed may be permanently attached to an article by any suitable means, a very simple and efficient attaching means being shown in Figs. 3, 4 and 5, the same consisting of a headed eyelet 5, resembling a button on its outside, and having its barrel 6 passed through the fabric or article to which it and the pronged plate are applied, with its leading end 7 extending through a hole 8 in the plate and upset or clinched thereupon, as shown in Fig. 5.

As shown in Fig. 5, 9 may represent a portion of the body of a seat cover, folded over on its edge, as at 10, and provided with an edge-binding 11.

As will be apparent, the pronged plates, mounted as described, permit the application of the article on which they are mounted to a fixed part by lifting the movable part to a height greater than the height of the fixed part, and then drawing the movable part downwardly so as to cause the prongs to enter the material of the fixed part until their offstanding portions arrest the further descent of the movable article.

As shown in Figs. 6 and 7, the plate may be provided with a prong 12, arranged between the prongs 2 and extending in the opposite direction thereto in order to enter the material of the fixed part and lock the plate in position against upward escape.

All of the prongs are integral with the plate and formed from its substance, and they lie wholly within the circumferential limits of the plate, whereby their points are protected against interference with outside objects.

Variations in the details of construction are permissible within the principle of the invention and the claim following.

What I claim is:—

A pronged plate device for attaching seat covers and other movable articles, comprising a plate having a parallel pair of pointed prongs incised therein and integral therewith and pointing in one and the same direction and arranged wholly within the circumferential limits of the plate and extending rearwardly and downwardly from the back of the plate and offstanding from the upper portion of the back of the plate so as to afford room between the back of the plate and said prongs for the entrance of the substance to which the movable article is applied and also afford a limit to such entrance, and an attaching device having a clinching element, said plate having a hole to receive and be engaged by said clinching element for fastening the plate in fixed position upon said movable article, said prongs projecting from the plate in position to engage an article to which said movable article is applied.

In testimony whereof I have hereunto set my hand this 7th day of August, A. D. 1928.

ARTHUR DYCKMAN PATCHEN.